Aug. 20, 1968   O. F. DENNEY ET AL   3,397,898
STABILIZER FOR MOTOR VEHICLE
Filed Feb. 6, 1967   2 Sheets-Sheet 1

INVENTORS
OMER F. DENNEY
RUSSELL D. PAGE
BY
Fryer, Tjensvold, Feix & Phillips
ATTORNEYS

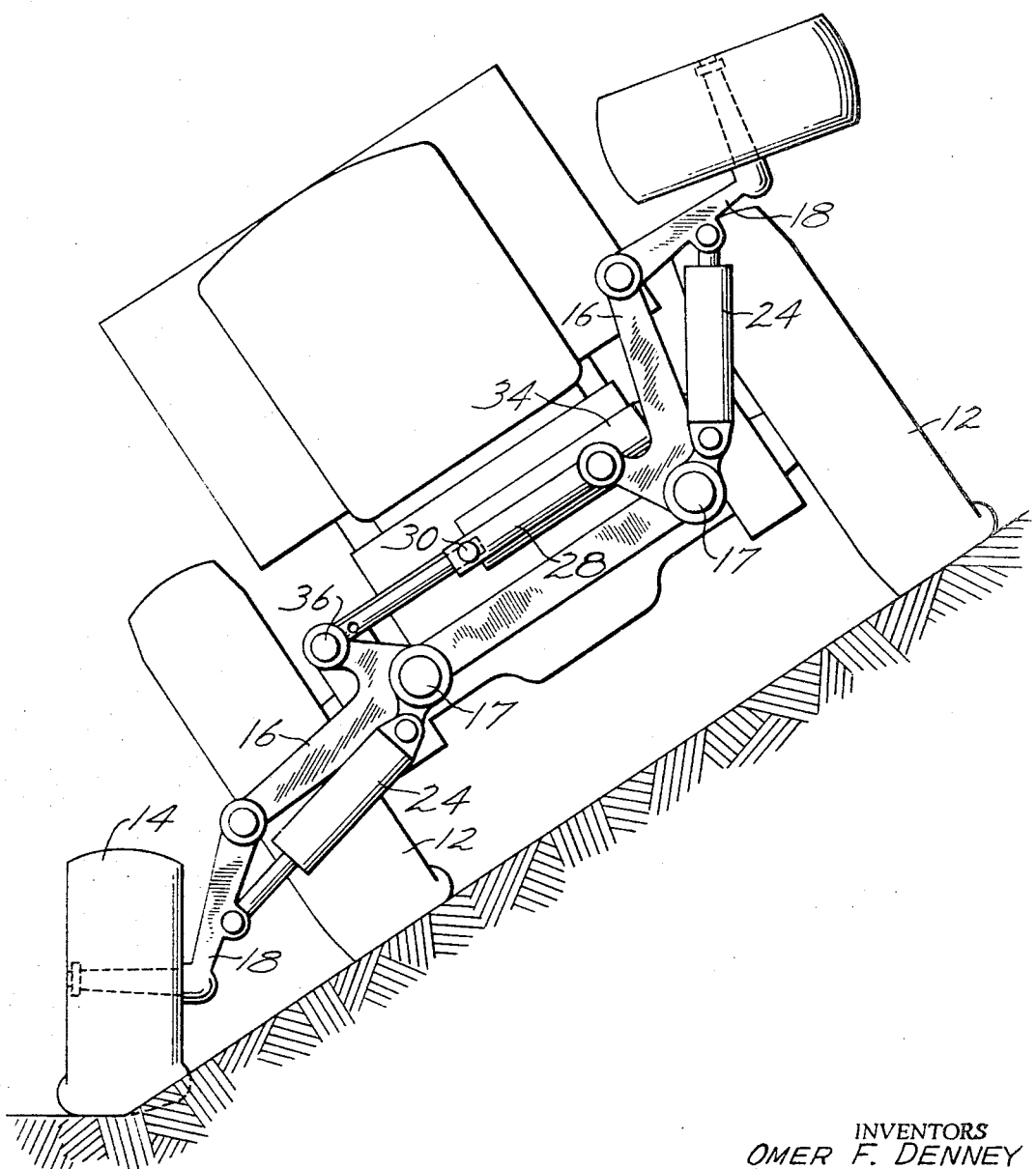

United States Patent Office 3,397,898
Patented Aug. 20, 1968

3,397,898
STABILIZER FOR MOTOR VEHICLE
Omer F. Denney, Fort Madison, Iowa, and Russell D. Page, Decatur, Ill., assignors to Caterpillar Tractor Co., Peoria, Ill., a corporation of California
Filed Feb. 6, 1967, Ser. No. 614,183
3 Claims. (Cl. 280—150)

ABSTRACT OF THE DISCLOSURE

A stabilizing device to prevent the overturning of a vehicle working on a steep incline and including power actuated struts extendible selectively from opposite sides of the vehicle and each having a ground engaging wheel.

Background of the invention

The field of the present invention is in the vehicle and more particularly the earthmoving vehicle art and it pertains specially to vehicles which may overturn in use.

It is known to lengthen an axle on the vehicle to give it lateral stability and such an arrangement is disclosed in the expired United States patent to Gustafson No. 2,100,005. The device there disclosed, however, is designed to stabilize a motor grader against the forces of high angle cutting with the blade raised while the machine is on level ground.

The present invention is for use in cutting a steep slope or angle when the machine itself is disposed on the slope.

It is the object of the invention to provide readily adjustable power actuated strut means operable to give lateral stability to a machine which is leaning to one side or the other during operation.

The invention will be described herein in connection with its application to a motor grader but its adaptability to use on other types of vehicles will become apparent from the ensuing description. In the description the invention is described in greater detail by reference to the accompanying drawings.

In the drawings:

FIG. 3 illustrates the stabilizing means being used.

Figure 1:
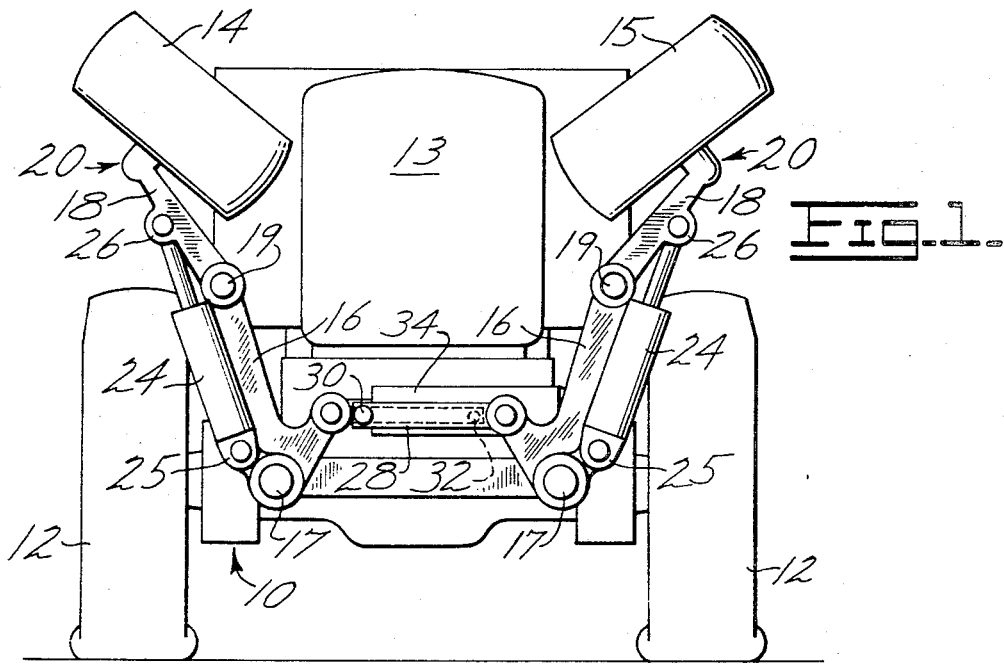
FIG. 1 is a schematic view in rear elevation of a motor grader having the stabilizing means of the present invention in a raised or in inactive position.

Motor graders of the type herein shown generally have two pairs of wheels supporting the frame with an engine and operator's station and a forwardly extending member supported at its forward end by a third pair of wheels and supporting the motor grader blade and an adjusting mechanism therefor. Such a motor grader is not disclosed in detail in the present drawings since the construction and operation of the stabilizing means can readily be understood from a rear elevation of the machine such as that shown in the drawings.

Referring first to FIG. 1, the motor grader is shown as having a frame generally indicated at 10 supported by wheels, the two rearmost of which are shown at 12 and an engine compartment is illustrated at 13. The stabilizer means comprises two wheels 14 and 15 adapted to be selectively lowered into contact with the ground to prevent overturning of the machine when it is operating on a steep slope. To support and adjust the wheels 14 and 15, bellcrank levers 16, one for each of the wheels, are pivoted to the frame as at 17. An arm 18 is pivoted to each of the levers 16 as at 19 and spindle assemblies generally indicated at 20 connect the wheels 14 and 15 with the arms 18. A pair of hydraulic jacks 24 is connected between a boss 25 on each of the bellcranks 16 and a boss 26 on each of the levers 18. Extension and retraction of these jacks is accomplished by hydraulic fluid under pressure from a suitable source on the vehicle which is subject to conventional well known controls. This enables adjustment of the angularity between the bellcranks 16 and the levers 18 and therefore enables variation in the attitude of the wheels 14 and 15 when they are in use.

Figure 2:
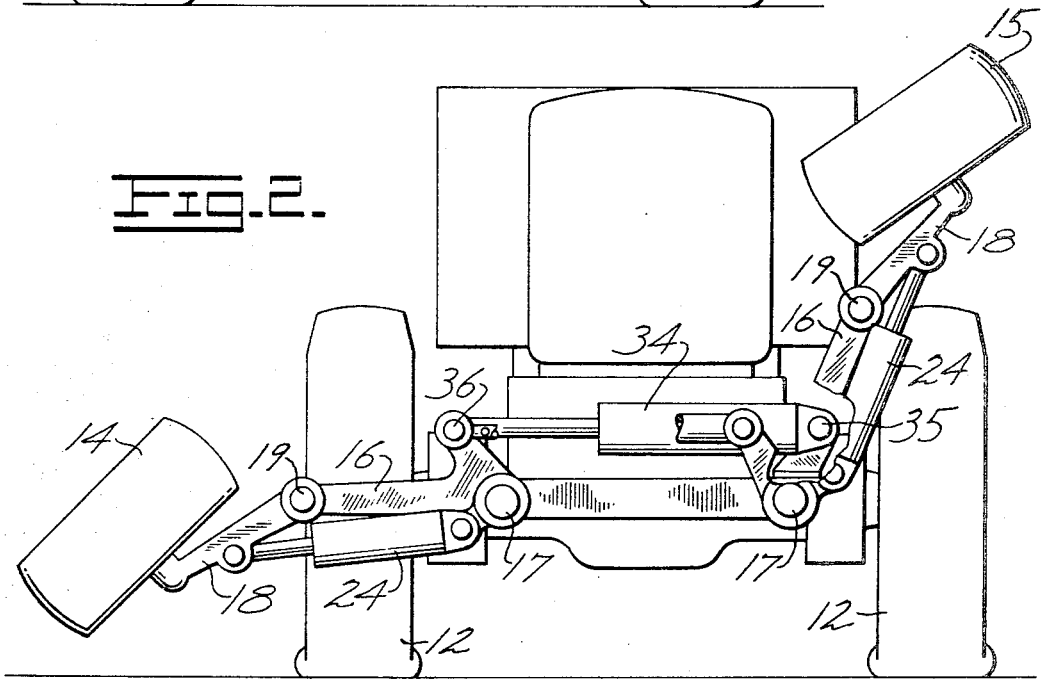
FIG. 2 is a similar view showing the stabilizing means adjusted to a position for use.

In FIG. 1, the bellcrank levers 16 are shown as connected by a telescoping link 28 which may be held in its short position by a pin shown at 30 or which may be elongated and held in its long position by the same pin 30 which extends through an alternate hole shown at 32 in FIG. 1, this position of the link being illustrated in FIG. 3. In FIG. 2, the link has been broken away better to disclose a jack 34 which extends between an anchor 35 fixed to the frame and a pivotal connection 36 on the left hand bellcrank 16. With the jack 34 extended from the position shown in FIG. 1 to the position shown in FIG. 2, the left hand bellcrank 16 is permitted to swing downwardly until the wheel 14 is in close proximity to the earth. Further extension of the jack 34 from this position brings the wheel into contact with the earth when the machine is on a grade as shown in FIG. 3 and serves to prevent overturning of the machine. Since the extended link 28 forms a connection betwen the two bellcranks, retraction of the jack 34 from the position shown in FIG. 2 raises the wheel 14 and at once lowers the wheel 15 so that it can be brought into contact with the earth and the position of the wheels as illustrated in FIG. 3 is reversed for stabilizing the machine when it is working on a slope inclined toward the opposite direction. The jack 34 is also controllable by conventional hydraulic means (not shown).

With the invention as herein described, an operator can readily move a stabilizing strut from its raised or carry position to its useful position with a wheel in engagement with the earth on either side of the machine. Furthermore the articulated components 16 and 18 of the strut which are adjustable by the jacks 24 enable the attitude of the stabilizing wheel to be adjusted for best engagement with the grade upon which the machine is working.

We claim:

1. Stabilizer means for a vehicle which works on sloping surfaces comprising a strut extending outwardly from each side of the vehicle, each strut including a bellcrank pivoted to the vehicle, an extensible link between ends of the bellcranks adjustable from a short length, holding both struts up, to a longer length where one strut can be lowered into contact with the earth.

2. The combination of claim 1 with a hydraulic jack acting between the vehicle and the struts to raise either one and lower the other.

3. The combination of claim 2 in which each strut includes an arm of one of said bellcranks and a link pivoted to said arm, a ground engaging wheel at the end of each link, and power actuated means for swinging each link about its pivotal connection with the strut.

References Cited

UNITED STATES PATENTS 2,750,204   6/1956   Ohrmann _____ 280—150

BENJAMIN HERSH, Primary Examiner.

R. SONG, Assistant Examiner.